Patented Feb. 18, 1941

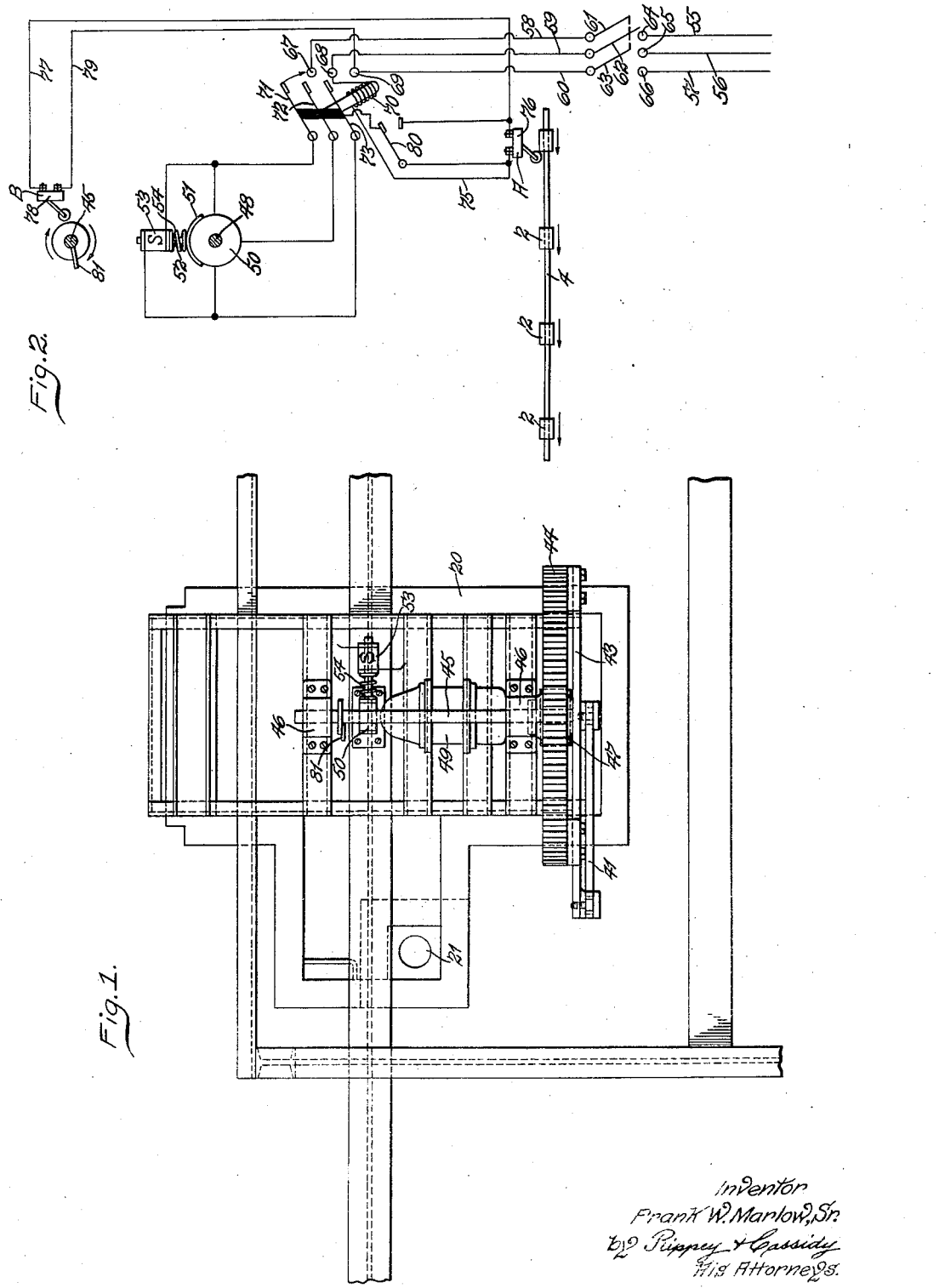

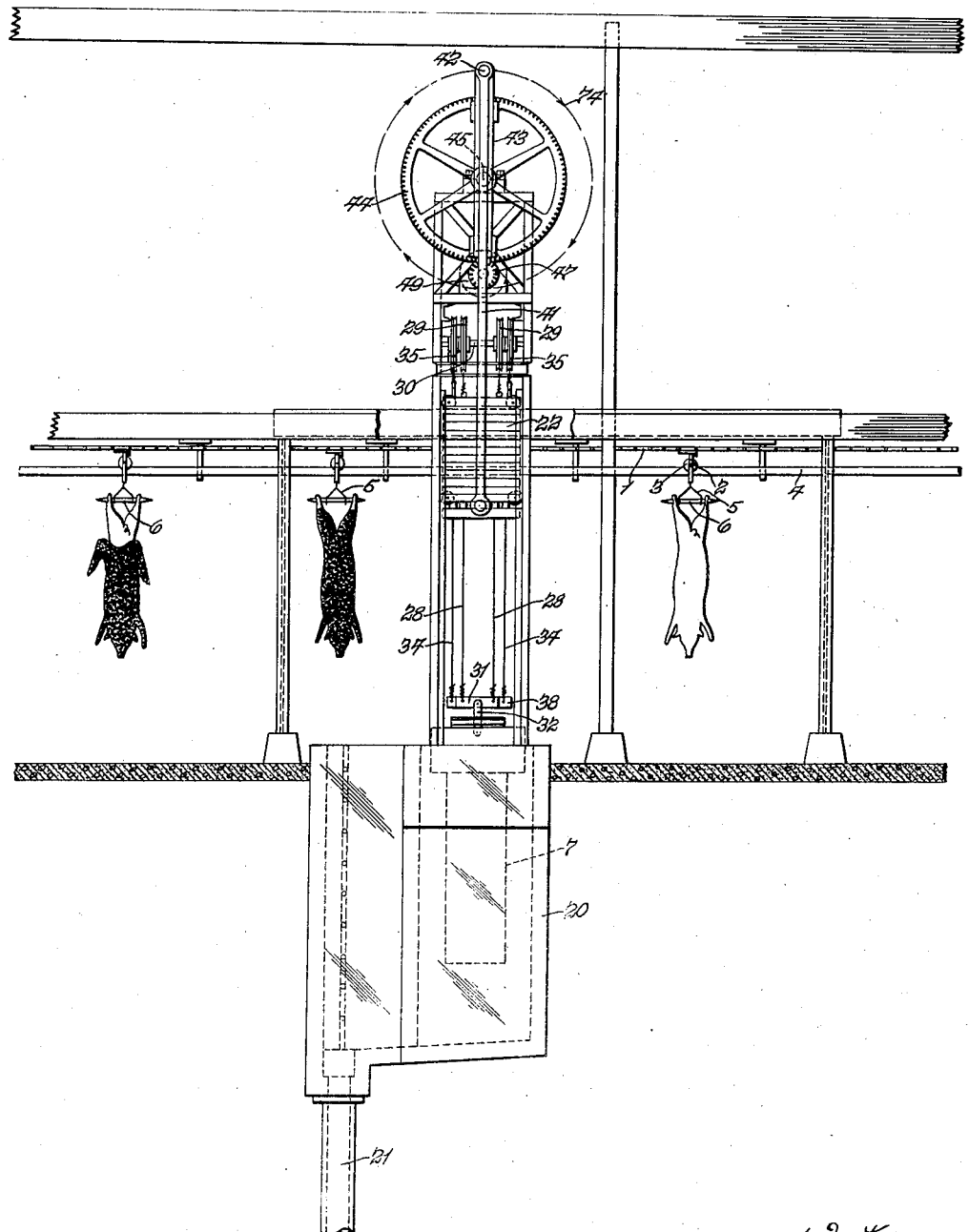

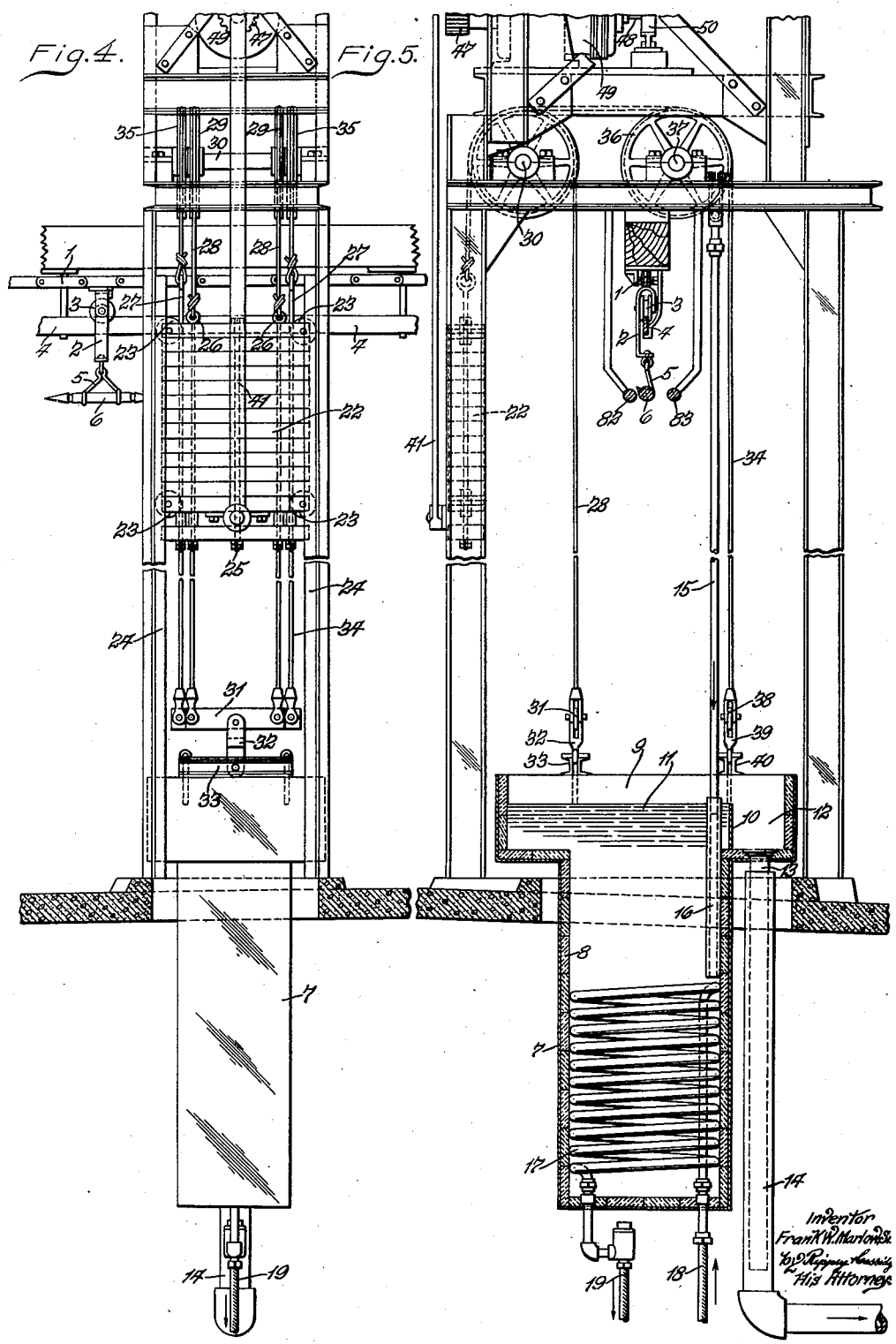

2,232,251

UNITED STATES PATENT OFFICE 2,232,251

AUTOMATIC MECHANISM FOR DIPPING HOG CARCASSES

Frank W. Marlow, Sr., University City, Mo., assignor of one-half to John F. Krey, St. Louis, Mo.

Application August 1, 1938, Serial No. 222,403

4 Claims. (Cl. 17—1)

This invention relates to automatic mechanism for dipping hog carcasses; and has special reference to automatic mechanism for dipping hog carcasses into a known hot adhesive mixture contained in a tank, and for quickly removing the hog carcasses therefrom so that, when the coating of adhesive mixture on the hog carcasses is brought into contact with atmospheric air in the room, said coating congeals around surplus hairs remaining on the carcasses.

Objects of the invention are to provide automatic mechanism for dipping hog carcasses into a known heated adhesive mixture contained in a tank and removing the hog carcasses therefrom almost immediately, so that the skins of the carcasses will not be injured or damaged by the heated mixture to such an extent that their utility for tanning purposes is destroyed; to provide such automatic mechanism that will operate to apply the coating of the adhesive mixture to the carcasses higher or further along the hind legs than other known mechanisms without permitting the mixture to enter the cuts exposing the gambrel cords, due to the fact that the cuts exposing the gambrel cords are on the upper parts of the legs when the carcasses are submerged in the adhesive mixture; to provide a construction and arrangement which is automatic in operation to such an extent as to eliminate or remove the need for an attendant or employee to push the carcasses into and under the adhesive mixture, because of the fact that the construction and arrangement is such as to force the carcasses vertically into the mixture substantially in the vertical position in which the carcasses are suspended by the gambrel-sticks; and to provide a mechanism of this character and for this purpose that operates with such accuracy, speed and precision as to leave the hog carcasses submerged in the tank of adhesive mixture for such a short duration of time (three to five seconds) as to prevent the application of sufficient heat and steam to cause the sebum to be exuded or to cook and sterilize other matter, including the skins of the carcasses.

Another object of the invention is to provide means for suspending the carcasses on the gambrel-sticks in such a manner as to prevent the carcasses from becoming detached from the gambrel-sticks during the dipping operations or during movement of the carcasses by the conveyor.

Other objects will be made apparent by the following description, reference being made to the annexed drawings, in which—

Fig. 1 is a plan view of the mechanism for dipping hog carcasses into the adhesive mixture.

Fig. 2 is a diagrammatic view of the electrical mechanism for controlling the operation of the invention.

Fig. 3 is a side elevation of the dipping mechanism constructed in accordance with the present invention.

Fig. 4 is an enlarged side elevation of the device constructed for use above an upper floor of a building and without the use of the recovery pit for the adhesive mixture shown in Fig. 3 and which, in the embodiment of Fig. 3, is designed to be embedded within the ground.

Fig. 5 is an elevation, partly in section, of that form of the invention shown in Fig. 4, viewed at right angles to Fig. 4.

The invention shown comprises an endless power-driven conveyor 1 which may be a chain or other device as desired, and which has attached thereto at spaced intervals a series of small trucks 2 having rollers 3 operating along a supporting rail 4. Hangers 5 swiveled to the frames 2 support the gambrel-sticks 6 for engagement with the gambrel cords of the hog carcasses to suspend the hog carcasses vertically with their heads extended downwardly in a familiar manner and as shown (Fig. 3).

The tank containing the known and available adhesive mixture preferably comprises a sheet metal shell 7 and a heat insulating lining 8, although the construction of the tank in this regard may be varied as desired. As shown, the tank is oblong in cross-section, having a greater horizontal width in one direction than in the other. Also, the upper end of the tank includes a widened and elongated portion 9 having therein a partition 10 rising from the bottom of the elongated portion and terminating substantially below the upper edge of said elongated portion, so that, when a hog carcass is immersed in the adhesive mixture 11, a portion of said adhesive mixture will flow over the upper edge of the partition 10 into the compartment 12 and be conducted through pipes 13 and 14 to a reclaiming vat or tank, to be there reconditioned for return to the dipping tank through a feed pipe 15, the open end of which operates within a guide 16 secured within the dipping tank (Fig. 5). The adhesive mixture 11 within the dipping tank is heated to about 300° F., more or less, by a heating medium, such as steam, supplied to a coil 17 within the dipping tank through a supply pipe or hose and, together with the condensate conducted from said coil 17, through a return pipe or hose 19.

In the arrangement shown in Fig. 3, the dipping tank operates into and out of a recovery pit 20 which may be embedded in the ground and which receives overflow of the adhesive mixture caused by the immersion of a hog carcass within the dipping tank, and which also receives drippings of adhesive mixture from the hog carcass during initial lateral movement of the hog carcass after it has been dipped. The overflow and the drippings of the adhesive mixture may be conducted from the pit 20 through a pipe 21 to a reclaiming vat or tank for reconditioning and return to the dipping tank through a feed pipe, such as the feed pipe 15.

A counterweight device 22 is equipped with rollers 23 operating within the channels and between the flanges of vertical channel bars 24 which guide the counterweight in its vertical movements and prevent substantial oscillation thereof during such movements. As shown, the counterweight 22 comprises a number of superimposed units clamped together by a bolt 25 (Fig. 4) and having extending therethrough near their ends two pairs of bolts 26 and 27. Flexible connections or ropes 28 have their ends connected to the upper ends of the respective bolts 26, pass over pulleys 29 mounted on a shaft 30, and have their opposite ends attached to a crosshead 31 connected with a link 32 attached to a cross member 33 rigid with the upper end of the dipping tank. Flexible connections or ropes 34 have their upper ends connected with the bolts 27, pass over pulleys 35 mounted on the shaft 30 and over pulleys 36 mounted on a shaft 37, and have their lower ends attached to a cross-head 38 connected with a link 39 secured to a cross member 40 in connection with the opposite side portion of the dipping tank.

A link 41 has its lower end pivoted to the counterweight device 22 and its upper end connected by a pivot 42 with the extended end of a bar 43 extending diametrically across and attached to a relatively large gear wheel 44. The gear wheel is attached to a shaft 45 journalled for rotation in bearings 46. The gear wheel 44 meshes with a pinion 47 attached to and driven by the shaft 48 of a motor 49. The shaft 48 has a brake drum 50 attached thereto (Fig. 1) for frictional engagement by a brake shoe 51 attached to the armature 52 of an electro-magnet 53. The brake shoe 51 is actuated into frictional engagement with the brake drum 50 by a spring 54 and is retracted from frictional engagement with said brake shoe 50 by the electro-magnet 53 when said electro-magnet is energized.

When the mechanism is in use, the conveyor 1 is operated continuously at slow speed by mechanism not herein specifically disclosed. Electrical energy controlling the mechanism for operating the dipping tank is supplied through three lines 55, 56 and 57, adapted to be placed in electrical communication with wires 58, 59 and 60, respectively, by the respective switch elements 61, 62 and 63, which may be controlled simultaneously. When the switch elements 61, 62 and 63 are in circuit with the contacts 64, 65 and 66 of the lines 55, 56 and 57, respectively, electrical communication is established through the wires 58, 59 and 60 to the contacts 67, 68 and 69. The circuit through 59 energizes the magnetic device 70 and places the switch elements 71, 72 and 73 in electrical communication with the contacts 67, 68 and 69, respectively, to operate the three-phase motor 49 and to energize the electro-magnet 53 and release the brake shoe 51 from the brake drum 50 and permit the motor to operate freely, with the result that the dipping tank is raised and lowered by a complete revolution of the gear wheel 44. As indicated, closing of the electrical circuit through 71, 72 and 73 supplies electrical energy to the motor to operate the motor at the proper time. The starting and stopping position of the mechanism for raising and lowering the dipping tank is illustrated in Fig. 3. As there shown, in the starting and stopping position of the motor and of the mechanism for raising and lowering the dipping tank, the bar 33 and the link 41 extend vertically diametrically across the gear 44. When the motor 49 starts, the pinion 47 rotates the gear 44 in a clockwise direction (Fig. 3), the pivot 42 moving in the annular path 74. This causes the link 41 to push downwardly the counterweight device 22 and thereby raise the dipping tank, at first by slow movement and then by more rapid movement until the pivot 42 moves through about 90° of its complete revolution; then the further upward movement of the dipping tank is at gradually reducing speed until the pivot 42 reaches its lowest point, after which the dipping tank is lowered at gradually increasing speed for a 90° movement of the pivot 42, and then at gradually reduced speed until the pivot 42 reaches its highest position as shown, in which position the motor and the mechanism for raising and lowering the dipping tank are stopped, as will now be described.

The wire 75 from the magnetic device 70 is connected with one side of a normally open switch 76, the opposite side of which is connected by a wire 77 with one side of a normally closed switch 78. The opposite side of the normally closed switch 78 is connected by a wire 79 with the contact 69.

The relationship of the parts is such that, when one of the continuously moving hog suspending small trucks 2 engages and closes the normally open switch 76 (Fig. 2), the circuit to the motor 49 is closed, the electro-magnet 53 is energized to release the brake shoe 51, and the dipping tank is raised to dip the hog carcass into the adhesive mixture in the tank almost completely but not far enough to permit the mixture to enter the gambrel cuts.

During the time that the switch 76 is open, which is the normal condition thereof, the magnetic device 70 is deenergized and the switch elements 71, 72 and 73 controlled thereby are open. Said switch devices 71, 72 and 73 are operated to closed position only by the magnetic actuating device 70 so that, when the said magnetic switch is open, the electro-magnet 53 remains deenergized, and the motor 49 remains stationary. When one of the carcass suspending small trucks 2 closes the switch 76, the magnetic actuating device 70 is immediately energized and closes the switch controlling the circuits to the motor 49 and to the electro-magnet 53, thereby immediately releasing the brake shoe 51 and starting the motor for the performance of that cycle of operation before described during which the dipping tank is raised to immerse the hog carcass in the adhesive mixture contained within the tank.

A by-pass switch 80 is controlled by the magnetic actuating device 70 to close the circuit from the wire 75 to the wire 77 when the magnetic actuating device is energized as a result of closing the switch 76. This will maintain the circuit to the motor 49 and to the electro-magnet 53 closed until the normally closed switch 78 is opened by an arm 81 projecting from the shaft 45. This opens the circuit to the motor 49 and to the electro-magnet 53 at the moment the dipping tank is in its lowest position and the operating mechanism therefor is in the position shown in Fig. 3, in which the counterweight 22 is at its highest point. The continuously moving conveyor 1 moves the hog carcass that had been dipped beyond the dipping tank, so that the mechanism is ready for another operation to dip within the adhesive mixture the next following hog carcass.

It should now be apparent that, during the movement of any carcass suspending truck 2 past the switch 76, said switch 76 is closed and held closed, thereby immediately closing the circuit to the motor 49 and to the electro-magnet 53 and keeping said circuit closed until the carcass suspending truck passes beyond and releases the switch 76, whereupon said switch is immediately opened. This occurs when the dipping tank is down, the counterweight 22 is up, and the link 41 extends vertically and diametrically across the gear 44 and beyond the upper periphery of said gear (Fig. 3). The electro-magnetic device 70 holds the switch 80 closed momentarily until the arm 81 opens the switch 78, whereupon the electro-magnet 53 is deenergized, the electric circuit to the motor is stopped, and the brake shoe 51 is set against the brake drum 50. These cycles of operation are repeated automatically and at substantially uniform intermittent intervals, so that the hog carcass is immersed in the hot adhesive mixture for only a very short time (from three to five seconds), as desired. This prevents the skin of the carcass from becoming damaged by cooking, but affords sufficient time for the moisture on the carcass within the adhesive mixture to become volatilized and form bubbles, reducing the specific gravity of the mixture relative to that of the hog carcass therein and diminishing the tendency of the adhesive mixture to suspend or cause the hog carcass to float. This automatic operation dispenses with the necessity of having an attendant push the hog carcass into and under the adhesive mixture, and thereby avoids the danger of having the adhesive mixture splashed upon the attendant, as would occur should the hog carcass become detached from the gambrel-stick and drop into the adhesive mixture in the dipping tank. The immersion of the hog carcass into the adhesive mixture within the dipping tank creates a pressure against the depending front legs as the adhesive mixture rises about the carcass, and the cantilever effect on the hind legs against one of the short guard rails 82 and 83, which are rigidly supported immediately above the dipping tank (Fig. 5), creates a downward pressure or pull on the hanger 5, thereby stabilizing the gambrel-stick and effectively preventing disengagement thereof from the gambrel cords of the carcass.

It is now clear enough that this invention attains all of its intended objects and purposes in a highly efficient, satisfactory and economical manner, and that the mechanism is free from disqualifying objections. The form, arrangement and relationship of the parts and elements comprising the invention may be varied as widely as equivalent limits will permit without departure from the nature and principle thereof.

While I have specifically referred to the dipping and coating of hog carcasses, it should be apparent that the invention may be applied to other uses.

I claim:

1. Mechanism for applying an adhesive coating to hog carcasses comprising devices for pivotally supporting and moving the carcasses continuously in an approximately horizontal direction, a tank below said devices adapted to contain an adhesive mixture with which the carcasses are to be coated, mechanism for moving said tank to immerse in the adhesive mixture therein the carcasses to be coated during continuous movement thereof, and a pair of rigid spaced elements above said tank cooperating with said devices to stabilize the same and prevent substantial bending of the hock joints and disengagement of the carcasses from said devices during immersion of the carcasses in the tank.

2. Mechanism for applying an adhesive coating to a hog carcass comprising a pivotally supported gambrel stick for engaging the hind legs of and suspending the carcass, a tank below said gambrel stick adapted to contain an adhesive mixture to coat the carcass, mechanism for moving said tank upwardly to immerse the carcass in the mixture therein, and devices engaging the hind legs of the carcass and preventing substantial bending of the hock points during immersion to stabilize and prevent disengagement of the carcass from the gambrel stick.

3. Mechanism for applying an adhesive coating to a hog carcass comprising a pivotally supported gambrel stick for engaging the hind legs of and suspending the carcass, a tank below said gambrel stick adapted to contain an adhesive mixture to coat the carcass, mechanism for moving said tank upwardly to immerse the carcass in the mixture therein, devices engaging the hind legs of the carcass and preventing substantial bending of the hock joints during immersion to stabilize and prevent disengagement of the carcass from the gambrel stick, mechanism for continuously moving the carcass during immersion thereof, and means controlled by the carcass controlling movement of said tank as aforesaid.

4. Mechanism for applying an adhesive coating to hog carcass comprising means for pivotally supporting and moving the carcasses continuously and in approximately horizontal direction, a tank supported for vertical movements below said devices and adapted to contain an adhesive mixture for coating the carcasses, a partition within said tank terminating below the top thereof regulating the amount of adhesive mixture retained in the tank and cooperating with the wall of the tank to form a compartment for receiving overflow of said mixture during immersion of the carcass in the tank, means for conducting the overflow mixture from said compartment, and elements for engaging the hind legs of the carcasses and preventing substantial bending of the hock joints during immersion of the carcasses and preventing disengagement of the carcasses from said devices.

FRANK W. MARLOW, Sr.